United States Patent [19]
Todd

[11] Patent Number: 6,018,874
[45] Date of Patent: Feb. 1, 2000

[54] SLEEVE FOR POWER CORDS

[76] Inventor: William M. Todd, 200 Cumberland Trace, Tullahoma, Tenn. 37388

[21] Appl. No.: 09/060,031

[22] Filed: Apr. 14, 1998

Related U.S. Application Data

[60] Provisional application No. 60/043,089, Apr. 15, 1997.

[51] Int. Cl.$^7$ .......................... B26B 19/02; A01D 34/14
[52] U.S. Cl. .......................... 30/210; 174/136; 439/502
[58] Field of Search ..................... 30/210, 276; 439/502; 174/136

[56] References Cited

U.S. PATENT DOCUMENTS

| | | | |
|---|---|---|---|
| 2,037,121 | 4/1936 | Dean | 83/785 |
| 3,173,519 | 3/1965 | Sullivan | 174/136 |
| 3,249,679 | 5/1966 | Bogese | 174/136 |
| 3,422,531 | 1/1969 | Lill et al. | 30/210 |
| 3,716,733 | 2/1973 | Keith et al. | 174/136 |
| 4,723,822 | 2/1988 | Merdic | 439/502 |
| 4,970,351 | 11/1990 | Kirlin | 174/136 |

*Primary Examiner*—Hwel-Slu Payer
*Attorney, Agent, or Firm*—Arnold White & Durkee

[57] ABSTRACT

A sleeve for surrounding a power cord, in whole or in part, for apparatuses such as hedge trimmers. The sleeve, preferably composed of a lightweight polymeric material in expanded, corrugated or similar form, has relatively large radial dimensions compared to the cord and therefore resists the insertion of the sleeve and the cord into apparatuses (such as a hedge trimmer's cutting blades) thereby preventing damage to the sleeve and the cord and preventing other undesired results. In addition, the relatively large size of the sleeve tends to increase the user's awareness of the sleeve and cord. Also the sleeve's increased rigidity compared to the cord aids in preventing the cord from being entangled in the apparatus and assists in managing and manipulating the cord. The sleeve is also lightweight and flexible enough so as not to constrain the intended function of the cord.

9 Claims, 12 Drawing Sheets

SLEEVE FOR POWER CORDS

This application claims benefit of provisional application Ser. No. 60/043,089 filed Apr. 15, 1997.

FIELD OF THE INVENTION

The present invention relates generally to sleeves, jackets, covers, tubes, pipes, hoses, wraps, tapes, wire looms and conduits for use with cords, cables or wires. The present invention relates more particularly to sleeves or jackets, which provide protection to, and increase manageability of, cords, cables or wires, especially power cords for portable electrical tools or appliances that typically require relatively long cords in actual use.

SUMMARY OF THE INVENTION

It is a primary object of the present invention to provide a lightweight low-cost sleeve that can protect devices such as power cords, cables or wires, such as the relatively long power cord typically used with electric hedge trimmers.

Another related object is to provide such an improved sleeve that is capable of enhancing the manageability of devices such as power cords or wires.

An additional object is to provide such an improved sleeve that is capable of increasing the user's awareness regarding the presence of devices such as power cords, cables or wires.

A further object is to provide such a device that protects against general wear and tear on relatively long power cords used with certain electrical tools or appliances such as hedge trimmers, edging trimmers, floor buffers and vacuum cleaners.

Other objects and advantages of the invention will be apparent from the following detailed description and the accompanying drawings.

In accordance with the present invention, the foregoing objectives are realized by providing a sleeve to surround, or to incorporate with, in whole or in part, the device to be affected. The sleeve is typically used with a portable electric tool having a driven element and an electrical power cord for connecting the tool to an electrical power source. The sleeve is adapted to fit onto at least a portion of the power cord and has a size, shape and material that protects the cord from damage in the event of accidental contact with the driven element.

The protective sleeve has a relatively large cross-section compared to the cross-section of the power cord or other element being protected. The invention reduces the likelihood of the power cord or other element being introduced into tools or appliances having moving or reciprocating parts, to prevent damage to both the cord or other protected element and/or the apparatus having the moving parts. This in turn thus prevents electrical hazards as well as maintaining the operability of the apparatus with the moving parts. Furthermore, the sleeve provides rigidity to the cord or other protected element to aid in the manageability of both the cord and the powered device. The invention also allows for preventing the entanglement of the device with its corresponding apparatus as described above. In addition, the invention's rigid exterior prevents abrasion of the device surrounded by the invention.

BRIEF DESCRIPTION OF THE DRAWINGS

FIG. 9a is an enlarged section taken along line 9a—9a in FIG. 9.

DESCRIPTION OF THE PREFERRED EMBODIMENT

While the invention is susceptible to various modifications and alternate forms, specific embodiments thereof have been shown by way of examples in the drawings and will be described in detail. It should be understood, however, that they are not intended to limit the invention to the particular forms described, but on the contrary, the intention is to cover all modifications, equivalents, and alternatives falling within the spirit and scope of the invention.

Figure 1:
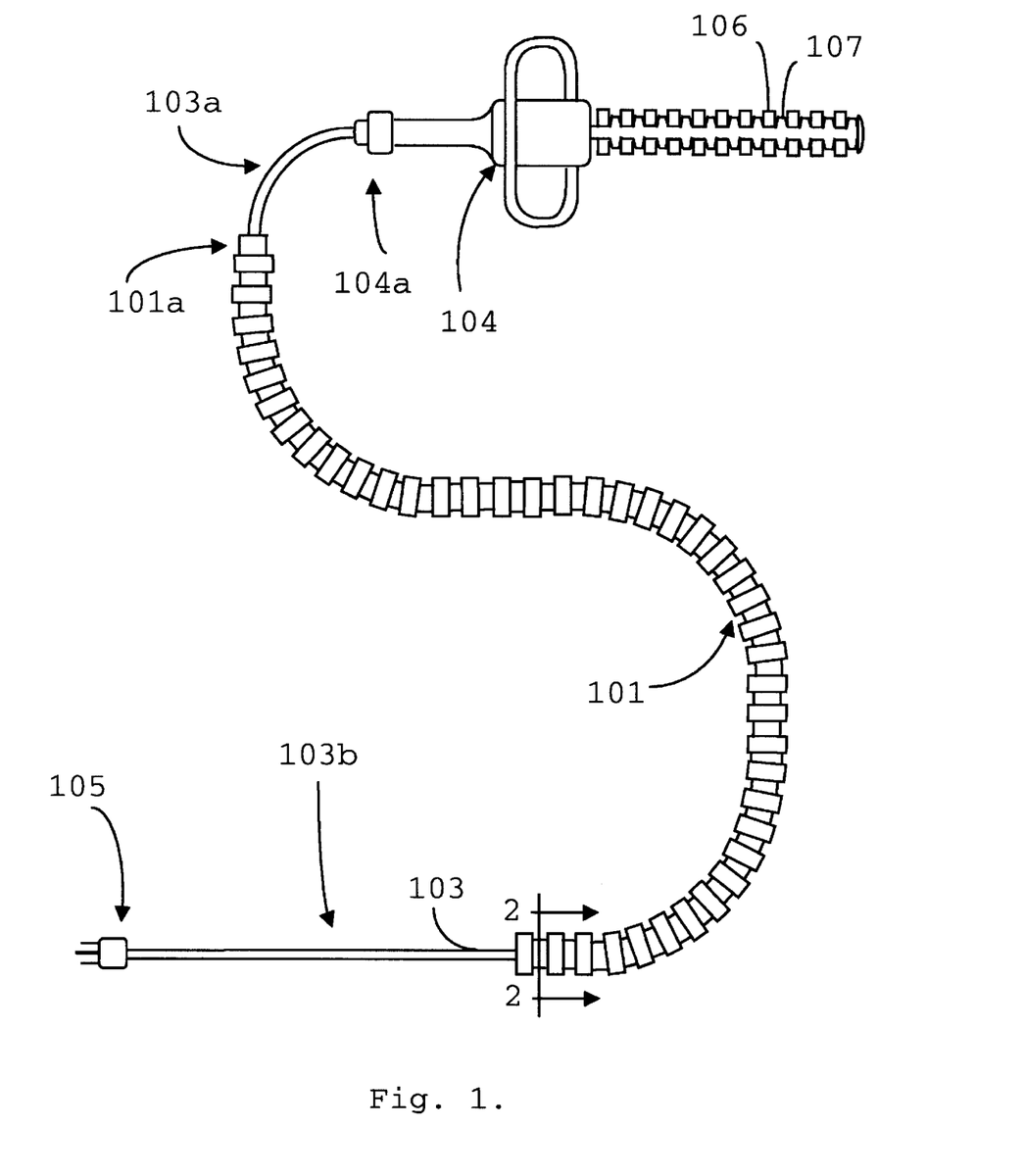
FIG. 1 is a drawing of a hedge trimmer and power cord that could be used with a sleeve embodiment of the present invention.

Turning now to the drawings, FIG. 1 is a drawing of a wire loom or corrugated hose, shown as sleeve 101, preferably resilient, semi-rigid, lightweight, and made from a polymeric material with fire retardent properties. Sleeve 101 partially surrounds an electric power cord 103 that corresponds to a typical electrically powered hedge trimmer 104.

In a preferred embodiment, sleeve 101 has a slit extending longitudinally along sleeve 101. The slit allows for easily placing sleeve 101 over power cord 103 by pulling away sleeve 101 at the slit and inserting power cord 103 into the hollow region within sleeve 101. In an alternative embodiment, sleeve 101 has a diameter sufficiently large enough to allow sleeve 101 to slide over the plug or receptacle of power cord 103. In this embodiment, the user or manufacturer would simply slide sleeve 101 over the plug or receptacle and feed power cord 103 through the hollow region within sleeve 101. Alternatively, the plug or receptacle could be installed on power cord 103 after sleeve 101 has been installed over power cord 103. The invention also contemplates any other method of placing sleeve 101 over power cord 103.

Sleeve 101 is attached to power cord 103 at region 101a so as to fix the relative longitudinal positions of sleeve 101 and power cord 103. Sleeve 101 is preferably attached to power cord 103 by a ratcheting pull-tie, cable tie or clamp that surrounds sleeve 101 or passes through holes in sleeve 101 and clinches sleeve 101 to power cord 103 thereby preventing longitudinal movement of sleeve 101 relative to power cord 103. The tie or clamp may be loosened to allow the sleeve to be adjusted, or moved longitudinally on the cord, and then retightened, in order to configure it for use with different apparatuses. In an alternative embodiment, sleeve 101 is attached to power cord 103 by a grommet disposed in sleeve 101, around the enclosed power cord 103, such that sleeve 101 can be clinched around the grommet and thereby prevent longitudinal movement of sleeve 101 relative to power cord 103. Alternatively, the grommet may be replaced with a bushing, reducer or adapter. In another alternative embodiment, sleeve 101 is attached to power cord 103 by adhesive disposed between a portion of sleeve 101 and power cord 103, thereby preventing longitudinal movement of sleeve 101 relative to power cord 103. The invention also contemplates any other method of securing sleeve 101 to power cord 103 that prevents longitudinal movement of sleeve 101 relative to power cord 103.

Figure 2:
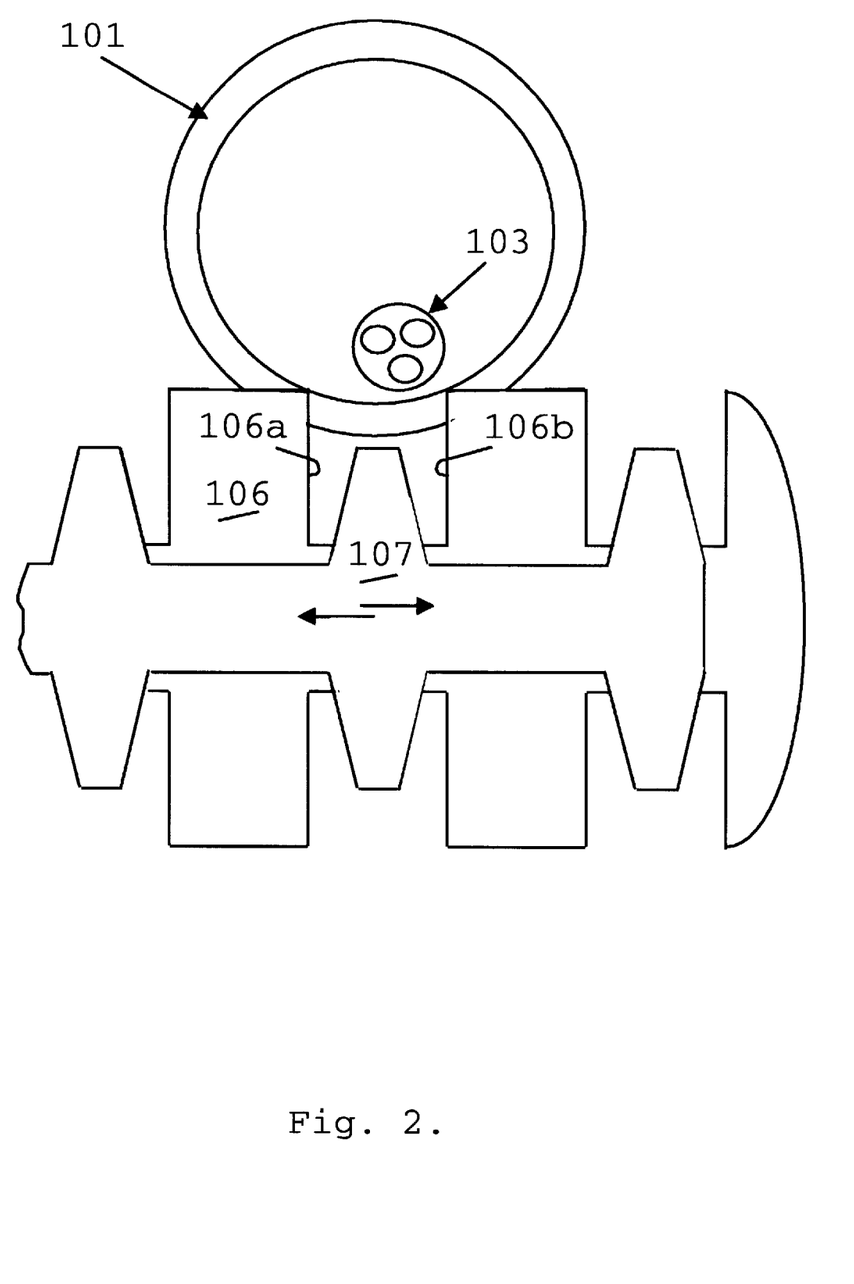
FIG. 2 is an enlarged cross-section of the sleeve and power cord taken generally along line 2—2 in FIG. 1 but includes an enlarged fragmentary side elevation view of a portion of the hedge trimmer blades shown in FIG. 1.

As can be seen most clearly in FIG. 2, the outside diameter of sleeve 101 is larger than the distance across the void in blade 106 measured between the surfaces 106a and 106b. Therefore, as sleeve 101 is introduced into this void, the semi-rigid properties of sleeve 101 prevent blade 106 from penetrating sleeve 101, thereby protecting power cord 103. Moreover, as sleeve 101 proceeds into the void, sleeve 101 is stopped, because of its diameter, after traveling only a short distance. Thus, sleeve 101 is prevented from contacting blade 107, thereby reducing the likelihood of damage to sleeve 101, power cord 103 and hedge trimmer blades 106 and 107.

Referring again to FIG. 1, segment 103a of power cord 103 need not be enclosed by sleeve 101 because the length of segment 103a is such that it cannot extend from cord attachment region 104a to blades 106 and 107 of hedge trimmer 104.

The segment 103b of power cord 103 is not enclosed by sleeve 101 because sleeve 101 need not extend along the entire length of power cord 103, to its end 105, in order to significantly reduce the likelihood of segment 103b contacting the blades 106 and 107 while the hedge trimmer 104 is in typical use. In typical use, segment 103b of power cord 103 is disposed on the ground, while only the segment of power cord 103 enclosed by sleeve 101 is suspended above the ground and potentially in proximity to hedge trimmer 104 and blades 106 and 107.

Figure 3:
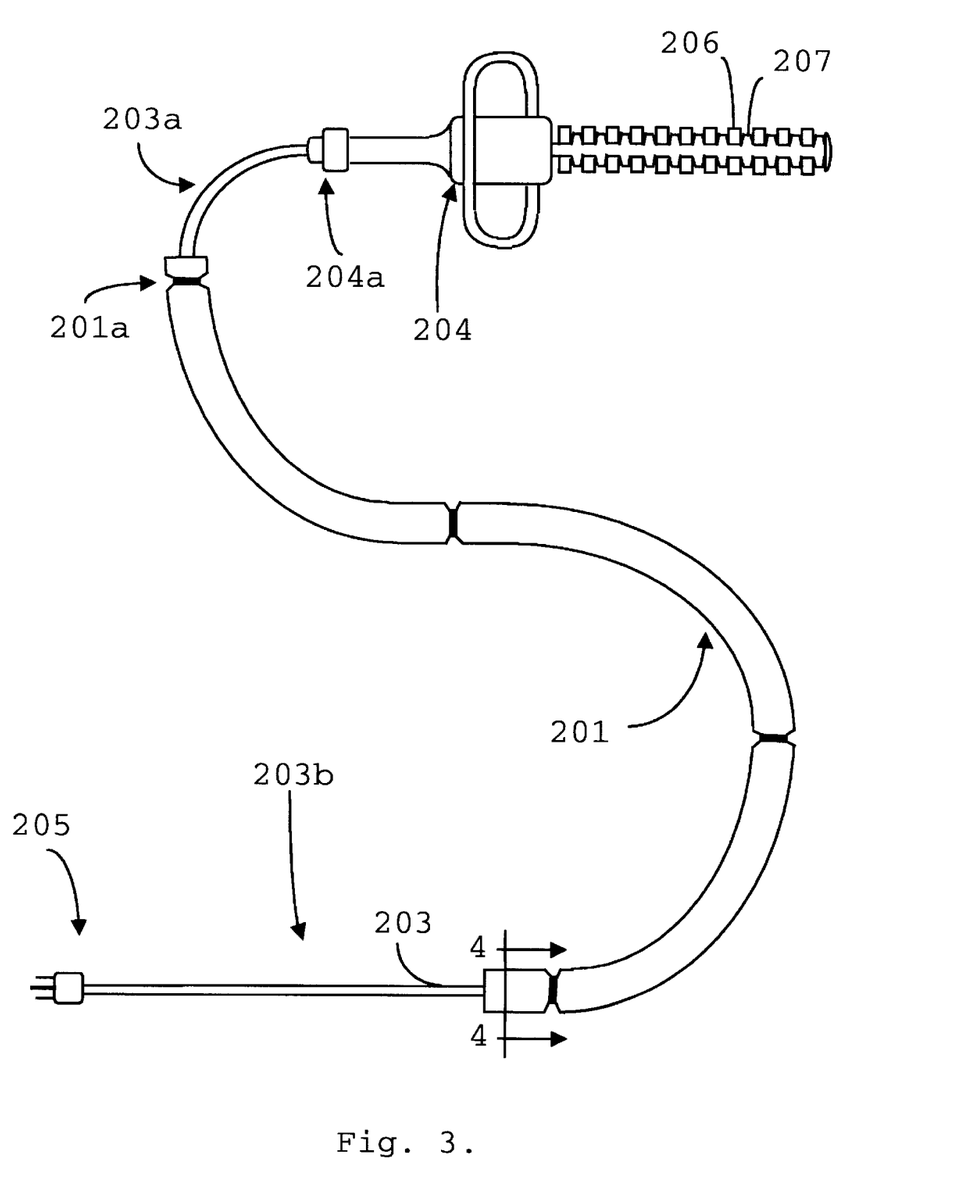
FIG. 3 is a drawing, similar to FIG. 1, of a hedge trimmer and a power cord that could be used with an expanded cylindrical sleeve embodiment of the present invention.
Figure 4:
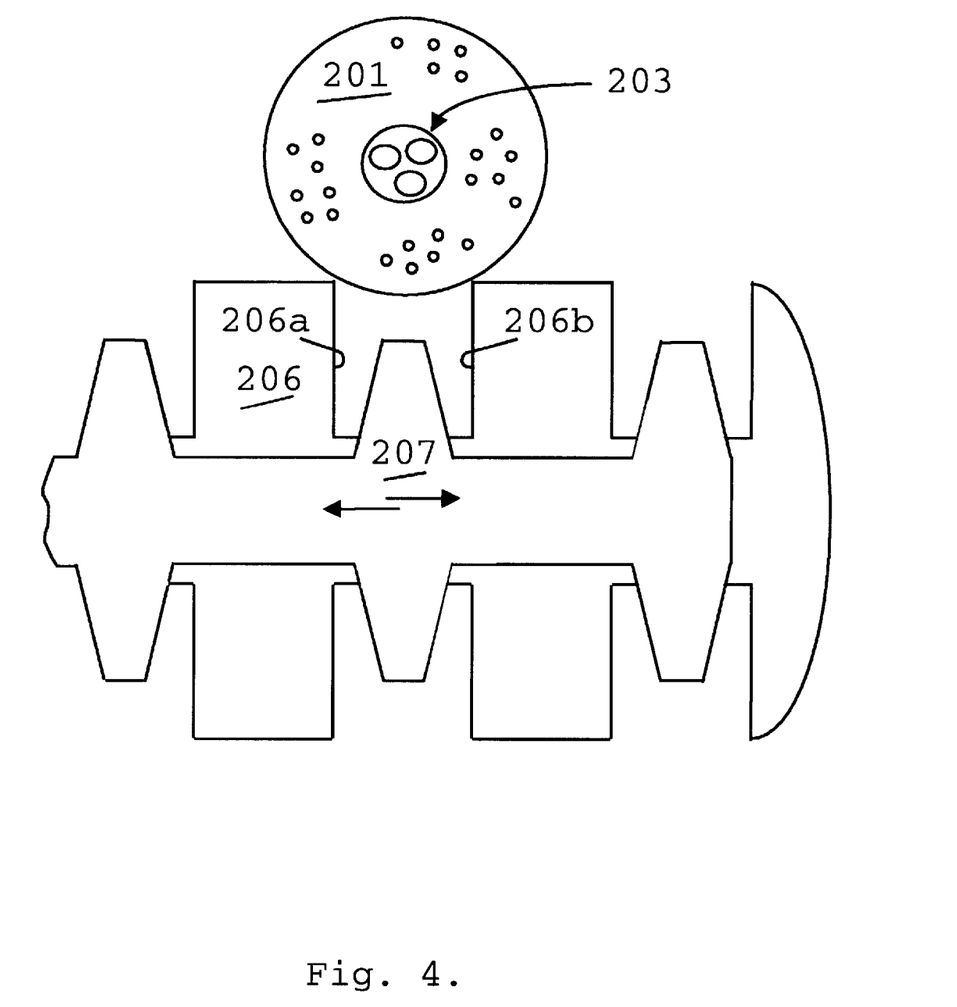
FIG. 4 is a drawing, similar to FIG. 2, with a cross-section taken generally along line 4—4 in FIG. 3.

FIG. 3 and FIG. 4 show an alternative embodiment of the present invention wherein a cylinder composed of an expanded polymeric material, shown as sleeve 201, partially surrounds power cord 203. Therefore, referring to FIG. 4, as sleeve 201 is introduced into the void between blade surfaces 206a and 206b, the sleeve 201 is stopped, because of its diameter, after traveling only a short distance. Thus, sleeve 201 is prevented from contacting blade 207, thereby reducing the likelihood of damage to sleeve 201, power cord 203 and hedge trimmer blades 206 and 207.

In a preferred embodiment, sleeve 201 has a slit extending longitudinally along sleeve 201. The slit allows for easily placing sleeve 201 over power cord 203 by pulling away sleeve 201 at the slit and inserting power cord 203 into the slit. In an alternative embodiment, sleeve 201 has a hollow center with an inner diameter sufficiently large enough to allow sleeve 201 to slide over the plug or receptacle of power cord 203. In this embodiment, the user or manufacturer would simply slide sleeve 201 over the plug or receptacle and feed the cord through the hollow center within sleeve 201. Alternatively, the plug or receptacle could be installed on power cord 203 after sleeve 201 has been installed over power cord 203. The invention also contemplates any other method of placing sleeve 201 over power cord 203.

Sleeve 201 is attached to power cord 203 so as to fix the relative positions of sleeve 201 and power cord 203. Sleeve 201 is preferably attached to power cord 203 by at least one ratcheting pull-tie, cable tie, band, or clamp that surrounds a portion of sleeve 201, as depicted at region 201a of sleeve 201 in FIG. 3, and clinches sleeve 201 to power cord 203, thereby attaching and preventing movement of sleeve 201 relative to power cord 203. The tie, band or clamp may be loosened to allow the sleeve to be adjusted, or moved longitudinally on the cord, and then retightened, in order to configure it for use with different apparatuses. In an alternative embodiment, sleeve 201 is attached to power cord 203 by at least one grommet disposed in sleeve 201, around the enclosed power cord 203, such that sleeve 201 can be clinched around the grommet and thereby prevent movement of sleeve 201 relative to power cord 203. Alternatively, the grommet may be replaced with a bushing, reducer or adapter. In another alternative embodiment, sleeve 201 is attached to power cord 203 by adhesive disposed between a portion of sleeve 201 and power cord 203 thereby preventing movement of sleeve 201 relative to power cord 203. The invention also contemplates any other method of securing sleeve 201 to power cord 203 that prevents movement of sleeve 201 relative to power cord 203.

Referring again to FIG. 3, segment 203a of power cord 203 need not be enclosed by sleeve 201 for the reasons stated above; namely, because the length of segment 203a is such that it cannot extend from cord attachment region 204a to blades 206 and 207 of hedge trimmer 204.

The segment 203b of power cord 203 is not enclosed by sleeve 201 because, as stated above, sleeve 201 need not extend along the entire length of power cord 203, to its end 205, in order to significantly reduce the likelihood of segment 203b contacting the blades 206 and 207 while the hedge trimer 204 is in typical use. In typical use, segment 203b of power cord 203 is disposed on the ground, while only the segment of power cord 203 enclosed by sleeve 201 is suspended above the ground and potentially in proximity to hedge trimmer 204 and blades 206 and 207.

Figure 5:
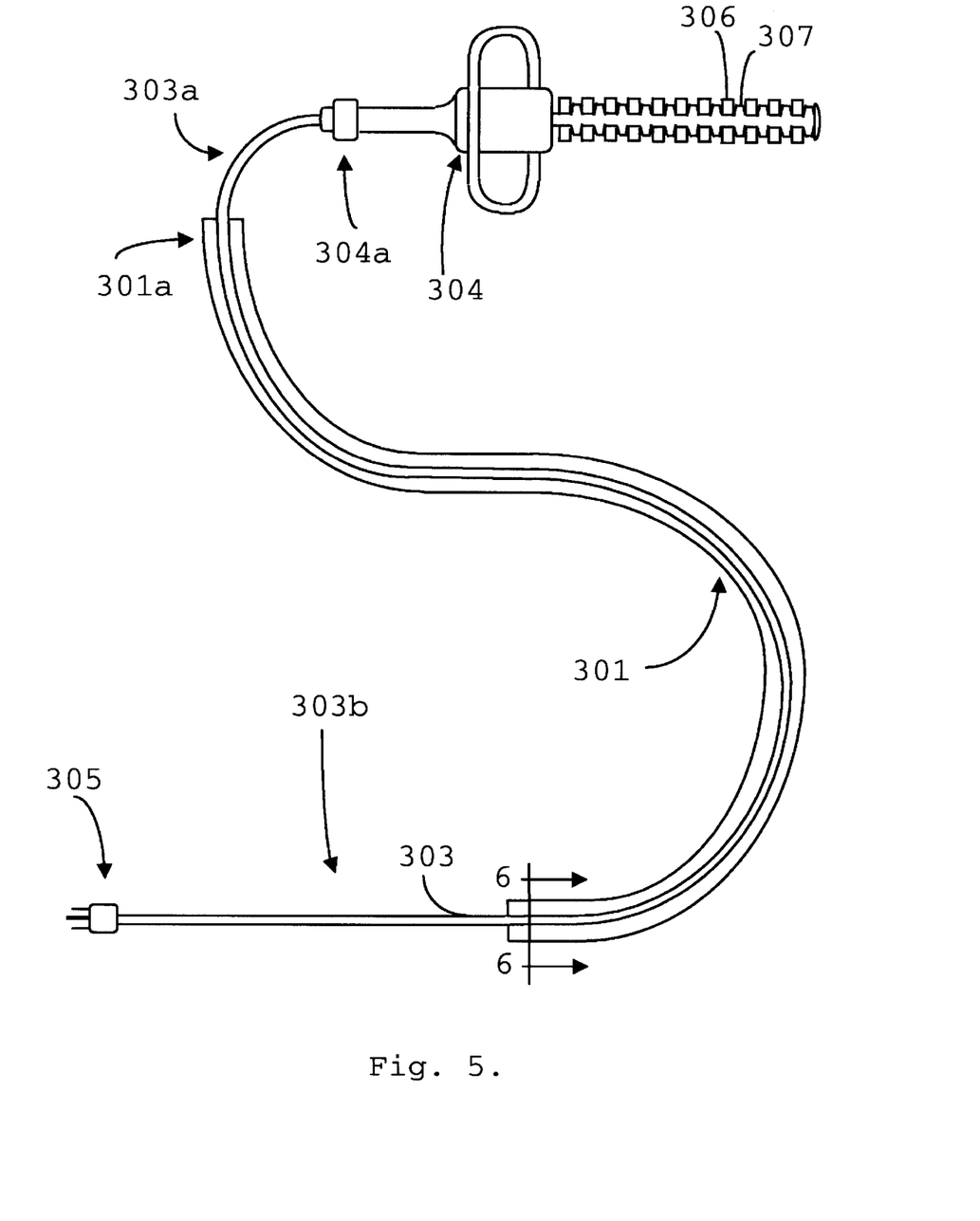
FIG. 5 is a drawing, similar to FIG. 1 and FIG. 3, of an alternative embodiment of the present invention wherein the device is partially disposed outside of one of the cylindrical sleeves of the present invention.
Figure 6:
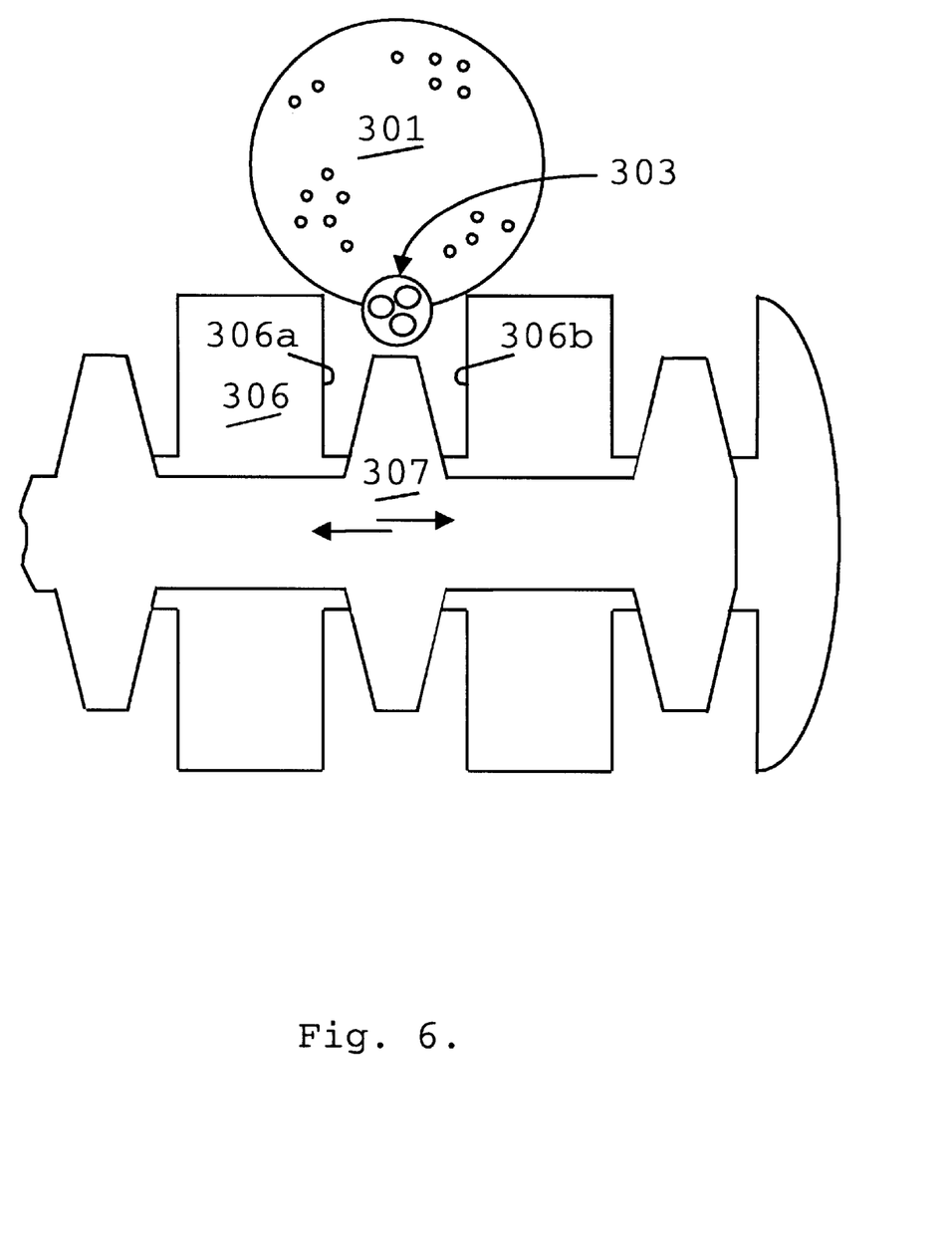
FIG. 6 is a drawing, similar to FIG. 2 and FIG. 4, with a cross-section taken generally along line 6—6 in FIG. 5.

FIG. 5 and FIG. 6 show an alternative embodiment of the present invention wherein power cord 303 is partially disposed outside of a protective flexible cylinder 301. Power cord 303 is protected from damage from blade 307 due to the diameter of the cylinder 301. Referring to FIG. 6, the diameter of cylinder 301 is such that the cylinder 301 is stopped after entering the void between blade surfaces 306a and 306b and before power cord 303 reaches blade 307.

Thus, power cord 303 is protected from damage from blade 307 despite being partially disposed outside of the cylinder 301.

Figure 7:
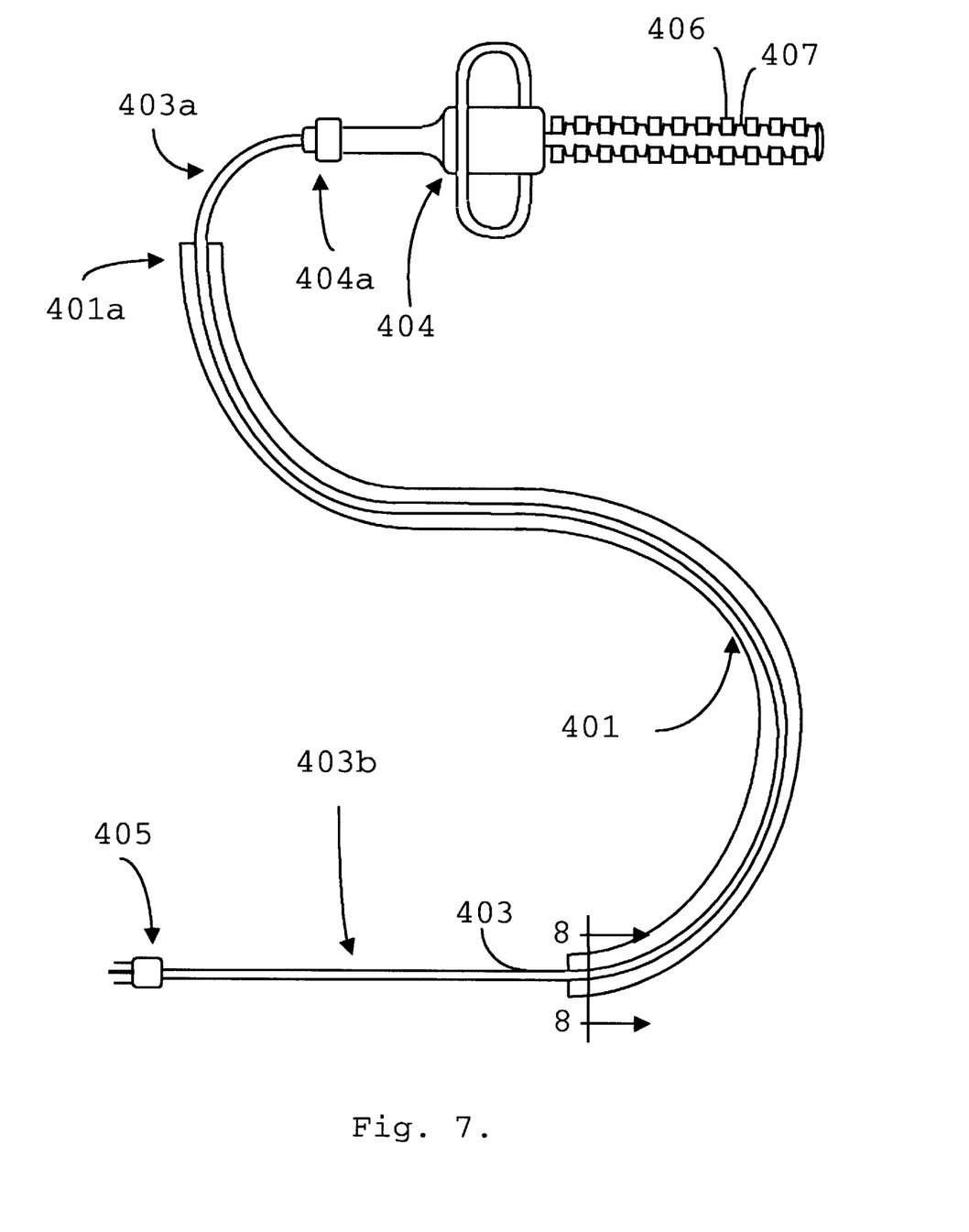
FIG. 7 is a drawing, similar to FIG. 1, FIG. 3 and FIG. 5 of an alternative embodiment of the present invention wherein the device is separated into multiple strands, each strand being enclosed in, or adjacent to, one of the cylindrical sleeves of the present invention such that the sleeve protects the strands from damage from the corresponding apparatus.
Figure 8:
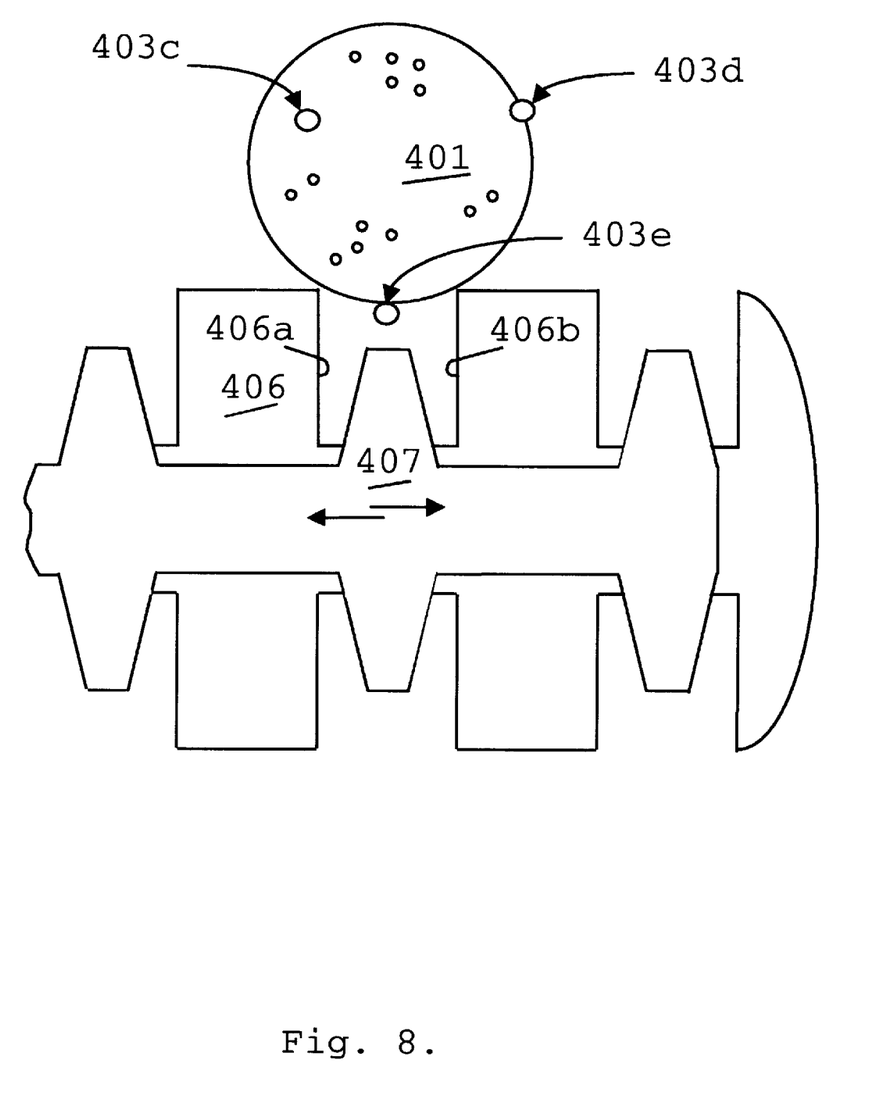
FIG. 8 is a drawing, similar to FIG. 2, FIG. 4 and FIG. 6, with a cross-section taken generally along line 8—8 in FIG. 7.

FIG. 7 and FIG. 8 show an alternative embodiment of the present invention wherein power cord 403 is separated into multiple strands 403c, 403d and 403e, each strand being enclosed in, or adjacent to, a protective flexible cylinder 401 such that the cylinder protects the strands from damage from blades 406 and 407 of hedge trimmer 404. The strands of power cord 403 are protected from damage from blade 407 because the diameter of the cylinder 401 is such that the cylinder is stopped after entering the void between blade surfaces 406a and 406b and before any strand of power cord 403 reaches blade 407. Thus, the strands of power cord 403 are protected from damage from blade 407 despite some of the strands being partially disposed outside of the cylinder 401.

Figure 9:
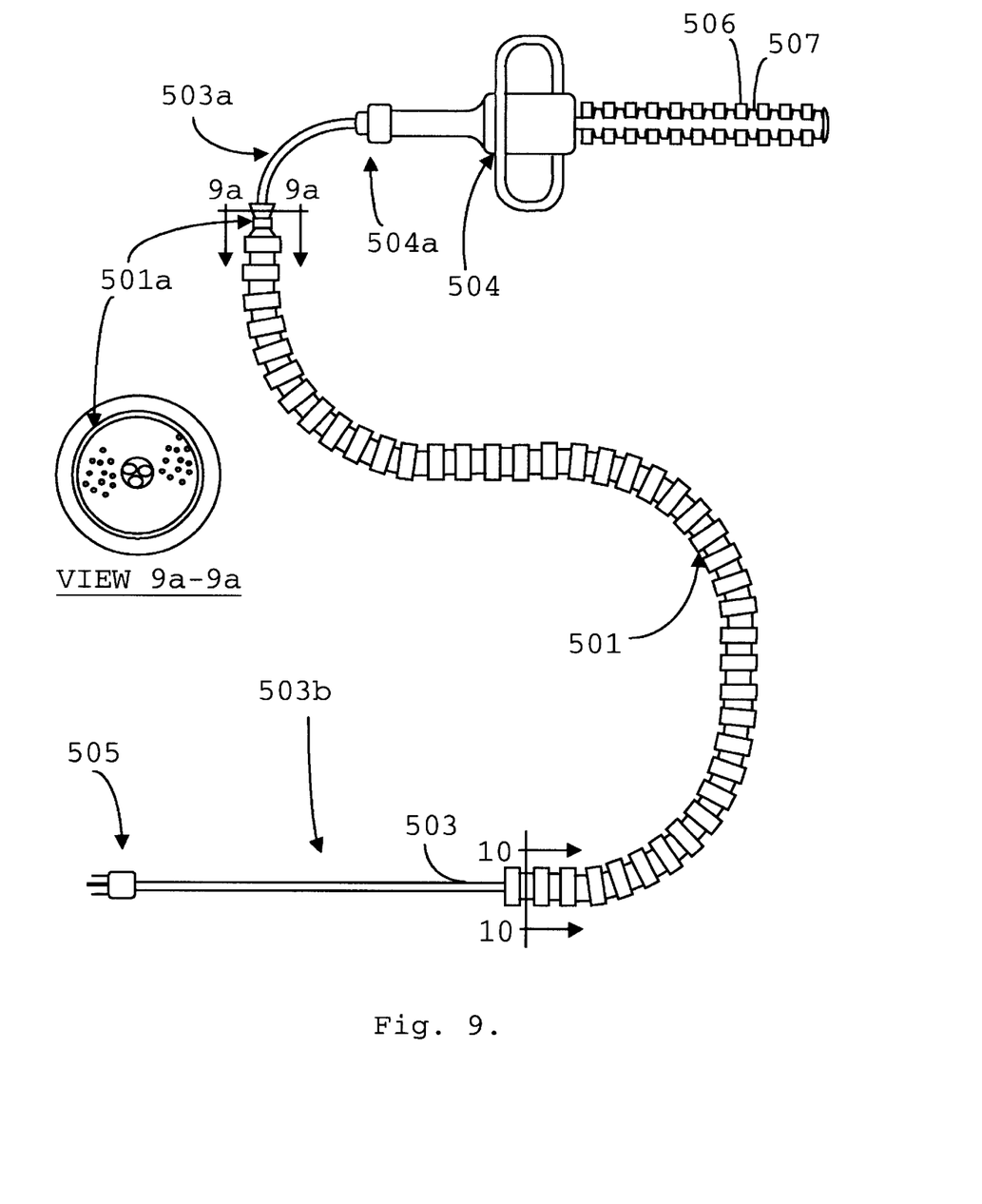
FIG. 9 is a drawing of another embodiment of the present invention, similar to FIG. 1, FIG. 3, FIG. 5 AND FIG. 7, of a corrugated sleeve surrounding an expanded polymeric material.
Figure 10:
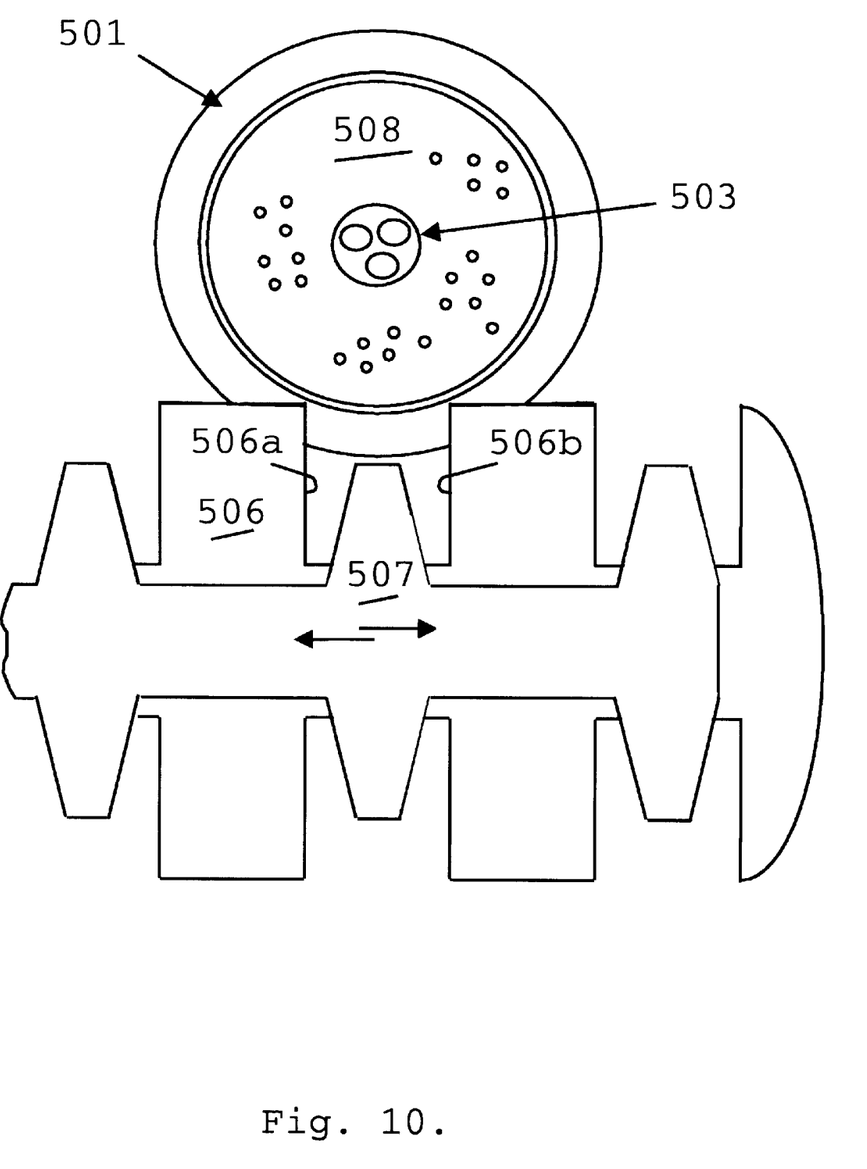
FIG. 10 is a drawing, similar to FIG. 2, FIG. 4, FIG. 6 AND FIG. 8, with a cross-section taken generally along line 10—10 in FIG. 9.

FIG. 9 and FIG. 10 show an alternative embodiment of the present invention wherein power cord 503 disposed within expanded polymer 508 and expanded polymer 508 is surrounded by a wire loom or corrugated hose shown as sleeve 501. Expanded polymer 508 will increase the crush resistance of the present invention. Sleeve 501 will increase the surface strength and abrasion resistance of the present invention. In a preferred embodiment, expanded polymer 508 has a slit extending longitudinally along expanded polymer 508. The slit allows for easily placing expanded polymer 508 over power cord 503 by pulling away expanded polymer 508 at the slit and inserting power cord 503 into the slit. A slit also extends longitudinally along sleeve 501. This slit allows for easily placing sleeve 501 over expanded polymer 508 by pulling away sleeve 501 at the slit and inserting expanded polymer 508 into the hollow region within sleeve 501. The slit of sleeve 501 would then be turned 180 degrees in relation to the slit of expanded polymer 508 so that the slits are no longer aligned thereby preventing power cord 503 from escaping from expanded polymer 508 or sleeve 501. At least one ratcheting pull-tie, band, clamp or cable tie 501a would then be installed over sleeve 501 to hold the invention in place over power cord 503. As shown in the sectional view in FIG. 9a, the cable tie 501a compresses the expanded polymers tightly against the power cord 503 to hold the sleeve 501 in place. In an alternative embodiment, the expanded polymer would be extruded around power cord 503 and then sleeve 501 would be slid over, and attached by adhesive to, expanded polymer 508. In another alternative embodiment, power cord 503 would be inserted in sleeve 501 and then sleeve 501 would be filled with expanded polymer 508. Alternatively, power cord 503 could be inserted into a slit in expanded polymer 508 and then sleeve 501 could be slid over expanded polymer 508 and power cord 503. Adhesive, cable ties, or pull-ties, as described previously, are then installed. The invention also contemplates any other method of placing expanded polymer 508 and sleeve 501 over power cord 503.

Figure 11:
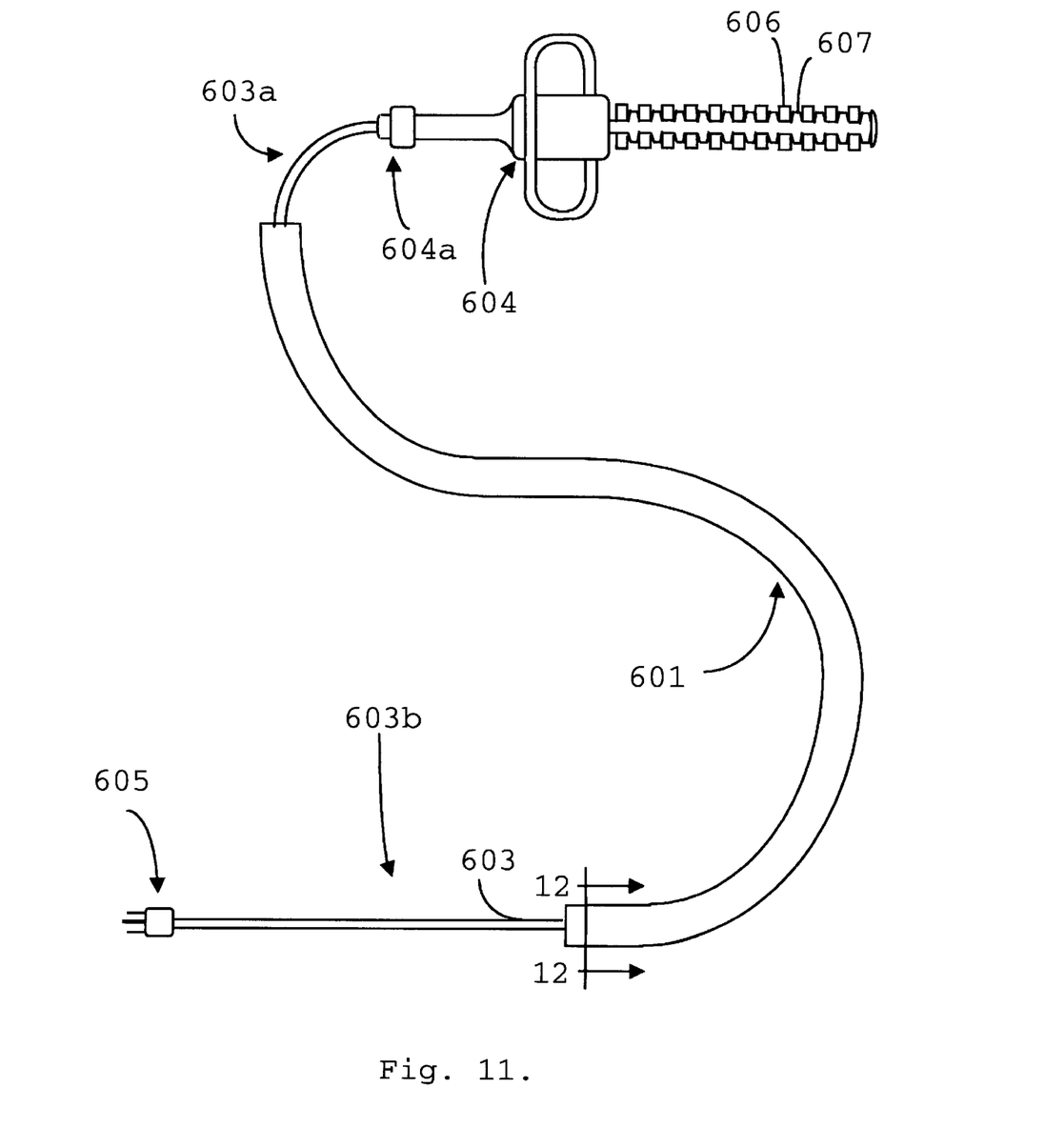
FIG. 11 is a drawing of yet another embodiment of the present invention, similar to FIG. 1, FIG. 3, FIG. 5, FIG. 7 and FIG. 9, of a pliable jacket surrounding an expanded polymeric material.
Figure 12:
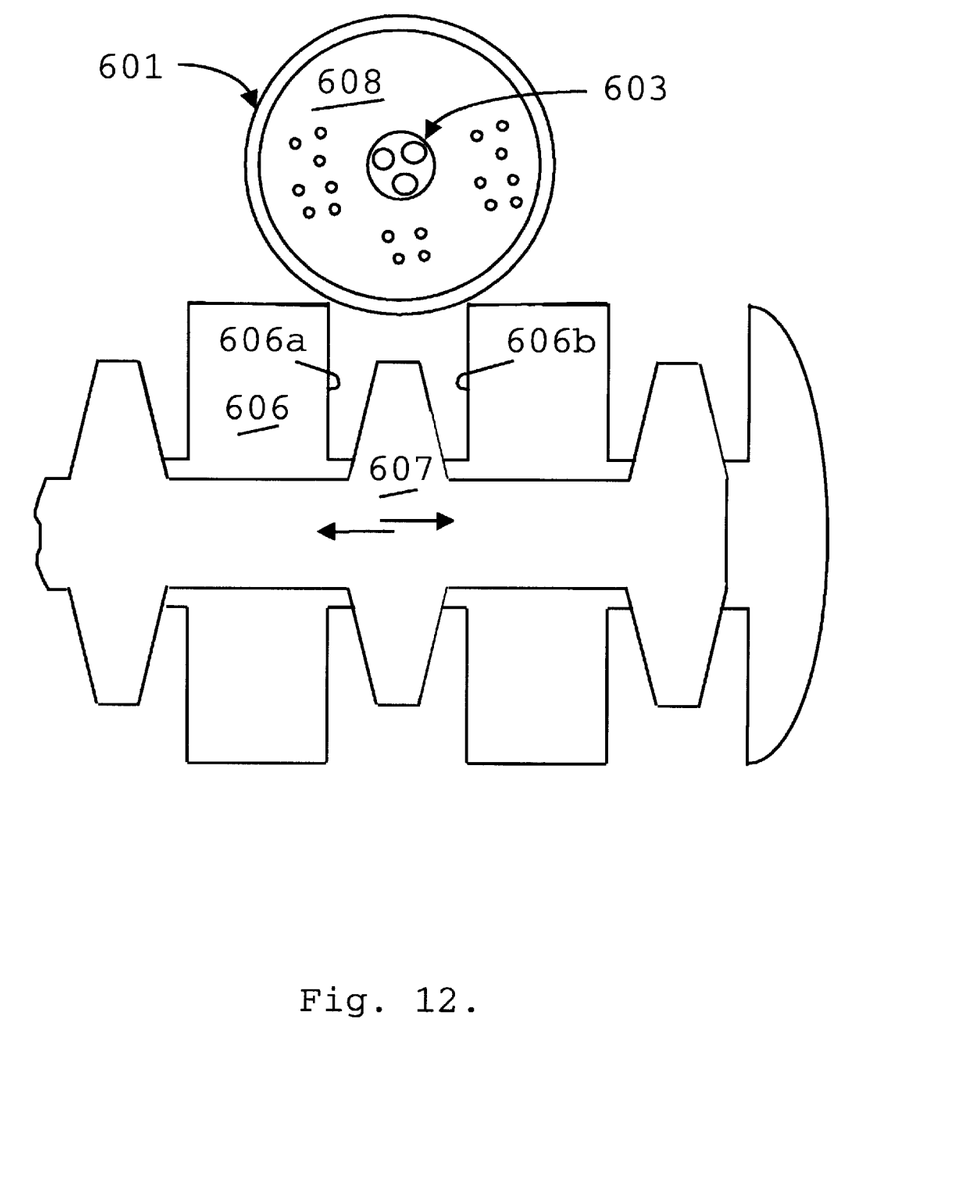
FIG. 12 is a drawing, similar to FIG. 2, FIG. 4, FIG. 6, FIG. 8 and FIG. 10, with a cross-section taken generally along line 12—12 in FIG. 11.

FIG. 11 and FIG. 12 show another alternative embodiment of the present invention wherein power cord 603 is disposed within expanded polymer 608 and expanded polymer 608 is surrounded by a pliable jacket shown as jacket 601. The power cord 603 is placed, into the expanded polymer 608 by any of the previously described methods. The pliable jacket 601, composed of a heat shrinkable material, is then easily placed over the expanded polymer 608, along with the power cord 603. Heat is then applied to jacket 601 to shrink jacket 601 onto expanded polymer 608, thereby preventing relative movement between power cord 603, expanded polymer 608 and jacket 601. In an alternative embodiment, the jacket 601, could be composed of an extrudable polymer and be extruded directly around the expanded polymer 608 after the power cord 603 had been disposed into the expanded polymer 608 by one of the previously described methods. Alternatively, the jacket 601 could be applied by wrapping it around expanded polymer 608, either in a circular or spiral fashion, and being affixed by an adhesive or a fusion process or by one of the tie methods described previously.

The above references to power cord 103, 203, 303, 403, 503, and 603 are meant to encompass both extension-type cords and power cords manufacturers include with, or as a part of, their apparatuses, or sell separately.

In addition, the sleeves of the present invention can be used with cords for apparatuses such as floor sanders, buffers, and vacuum cleaners with rotating brushes; hand-held saws, drills, nailers, sanders, and buffers; and mowers, trimmers, and edgers. The sleeves of the present invention may also have other cross-sectional shapes such as square, rectangular, semicircular or half-elliptical. The color of the sleeves of the present invention may also be varied to contrast with the background associated with the particular apparatus, e.g., the green bushes associated with hedgers or the white walls associated with drills. Furthermore, the sleeves of the present invention are of various lengths to facilitate particular applications, e.g., indoor and outdoor applications.

Additional benefits achieved by the present invention include, but are not limited to, the following. The larger diameter of the sleeve of the present invention compared with a power cord will cause an apparatus to push a power cord using the present invention out of the way rather than entangling the cord, cutting the cord, etc. The larger size of the sleeve compared with a power cord and the contrasting color of the sleeve compared with the cord and the background associated with the apparatus will increase the user's awareness of the sleeve and cord, thereby reducing the likelihood of damage to the sleeve or cord. Moreover, the increased rigidity of the sleeve compared with a power cord will increase the manageability of a power cord using the present invention. The increased rigidity and size of the protected cord assists in managing the cord to keep it out of the way without becoming entangled with itself or other objects. Also, the protected cord tends to ride on the top of grass or bushes rather than falling down into the grass or bushes. The fact that the protective sleeve can be moved relative to the cord allows the cord to be easily inspected for wear or damage along its length. Finally, the protective sleeve reduces general wear and tear on the power cord.

I claim:

1. A combination of
    a portable electric hedge trimmer having a driven reciprocating toothed blade cooperating with a stationary toothed blade, and an electrical power cord for connecting the hedge trimmer to an electrical power source, and
    a protective sleeve made of a resilient polymeric inner member and a corrugated tubular outer member, said protective sleeve surrounding the outer surface of at least a portion of said power cord and having a diameter greater than the space between a pair of adjacent teeth in said stationary blade to protect said cord from damage by accidental contact with said reciprocating toothed blade.

2. The combination of claim 1 further includes means for compressing said protective sleeve radially inwardly against said power cord to hold said sleeve in place on said cord.

3. The combination of claim 1 wherein said resilient polymeric inner member is made of a foamed polymeric material.

4. A portable electric hedge trimmer comprising the combination of
   a driven reciprocating toothed blade cooperating with a stationary toothed blade,
   an electrical motor for driving said reciprocating toothed blade,
   an electrical power cord for connecting the electrical motor to an electrical power source, and
   a protective sleeve made of a resilient polymeric inner member and a corrugated tubular outer member, said protective sleeve surrounding the outer surface of at least a portion of said power cord and having a diameter greater than the space between a pair of adjacent teeth in said stationary blade to protect said cord from damage by accidental contact with said reciprocating toothed blade.

5. The portable electric hedge trimmer of claim 4 further includes means for compressing said protective sleeve radially inwardly against said power cord to hold said sleeve in place on said cord.

6. The portable electric hedge trimmer of claim 4 wherein said resilient polymeric inner member is made of a foamed polymeric material.

7. A method of protecting the power cord of a portable electric hedge trimmer having a driven reciprocating toothed blade cooperating with a stationary toothed blade and an electrical motor for driving said reciprocating toothed blade and connected to an electrical power source by said cord, said method comprising
   attaching a protective sleeve made of a resilient polymeric inner member and a corrugated tubular outer member, said protective sleeve surrounding the outer surface of at least a portion of said power cord, said sleeve having a diameter greater than the space between a pair of adjacent teeth in said stationary toothed blade to protect said cord from damage by accidental contact with said reciprocating toothed blade.

8. The method of claim 7 further includes the step of compressing said protective sleeve radially inwardly against said power cord to hold said sleeve in place on said cord.

9. The method of claim 7 wherein said resilient polymeric inner member is made of a foamed polymeric material.

* * * * *